No. 883,946. PATENTED APR. 7, 1908.
T. J. FORDE.
GASOLENE HEATING AND LIGHTING APPARATUS.
APPLICATION FILED JUNE 5, 1907.

2 SHEETS—SHEET 1.

WITNESSES: INVENTOR.
E. M. Fisher Thomas J. Forde.
BY Fisher & Moser
ATTORNEYS

No. 883,544. PATENTED APR. 7, 1908.
T. J. FORDE.
GASOLENE HEATING AND LIGHTING APPARATUS.
APPLICATION FILED JUNE 5, 1907.

2 SHEETS—SHEET 2.

WITNESSES:
E. M. Fisher
F. C. Museum

INVENTOR.
Thomas J. Forde.
BY Fisher & Moser
ATTORNEYS.

UNITED STATES PATENT OFFICE.

THOMAS J. FORDE, OF GENEVA, OHIO.

GASOLENE HEATING AND LIGHTING APPARATUS.

No. 883,946.   Specification of Letters Patent.   Patented April 7, 1908.

Application filed June 5, 1907. Serial No. 377,288.

*To all whom it may concern:*

Be it known that I, THOMAS J. FORDE, a citizen of the United States, residing at Geneva, in the county of Ashtabula and State of Ohio, have invented certain new and useful Improvements in Gasolene Heating and Lighting Apparatus, and do declare that the following is a full, clear, and exact description of the invention, which will enable others skilled in the art to which it appertains to make and use the same.

My invention relates to a gasolene lighting apparatus of the kind in which the gasolene is kept under atmospheric pressure in a suitable tank and forced forward and vaporized in the apparatus for illuminating and heating purposes, chiefly, all substantially as shown and described and particularly pointed out in the claims.

Figure 1:
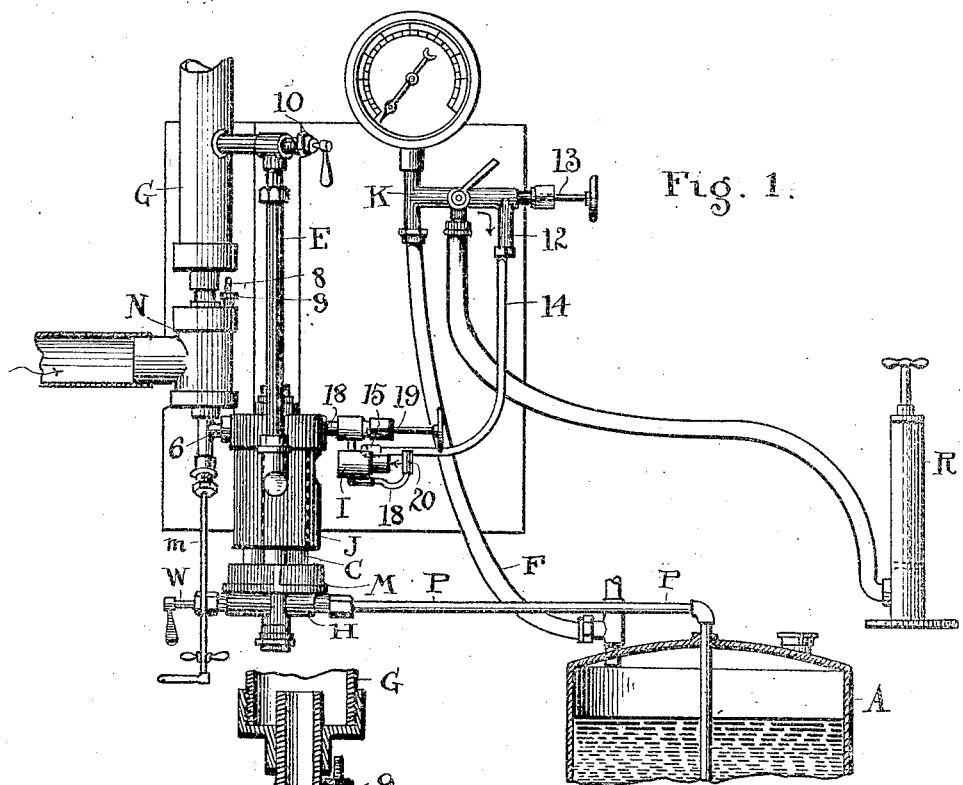
Figures 2, 3:
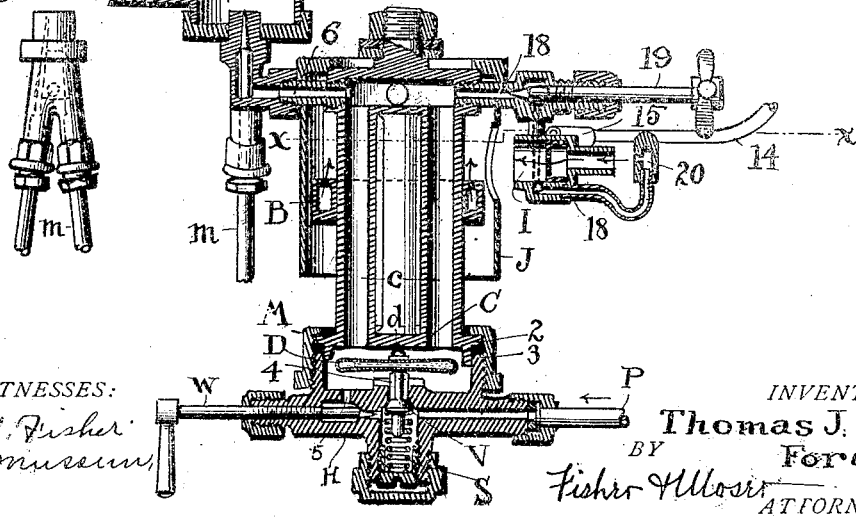
Figure 4:
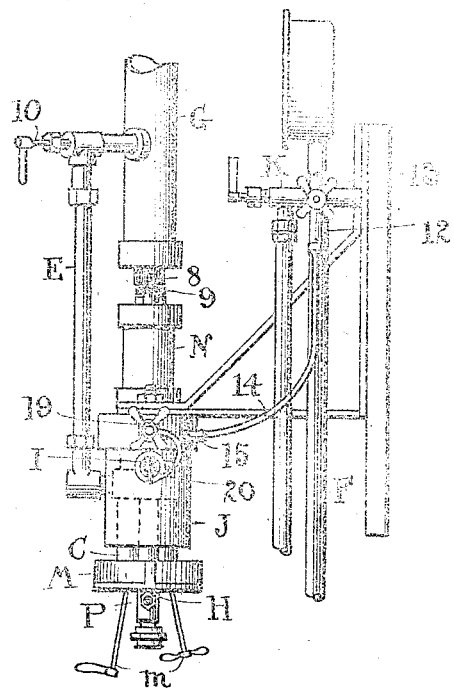
Figure 6:
Figure 7:
Figure 5:
Figure 5:
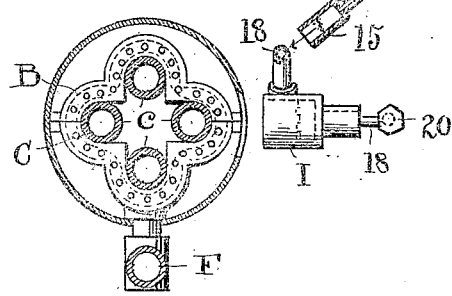

In the accompanying drawings, Figure 1 is a side elevation of an apparatus and a sectional elevation of a portion of the gasolene tank connected therewith and showing the parts more or less in diagrammatic relations in order to bring the complete apparatus into one view. Fig. 2 is a vertical central sectional elevation of the immediate operating parts of the apparatus practically developed for service, and Fig. 3 is a side elevation of a pair of valves and mountings therefor, as will hereinafter more fully appear. Fig. 4 is an elevation of the apparatus looking from the right of Fig. 1 with the gasolene tank omitted. Fig. 5 is a cross section of the generator and other parts, on a line corresponding to $x\ x$, Fig. 2. Fig. 6 is a perspective view of the diaphragm which automatically controls the main supply valve to the apparatus, and Fig. 7 is a perspective view of the valve which said diaphragm operates, all as hereinafter more fully described.

I am of course, aware that an apparatus of this general character is not broadly new at this time, and I do not pretend to claim such an apparatus broadly, as my present invention, but I am not aware that anyone has ever before made or used the construction shown herein, particularly as to specific parts and combinations and details which, as I believe, materially simplify the apparatus and render it safe and economical. For example, among other things I have provided an automatic cut-off for the gasolene in case the pressure goes down or the lights are extinguished, so that all danger of explosion from escape of gas or vapor is thus avoided and one can leave the lights burning and go away from the apparatus in perfect safety, depending upon the automatic mechanism to protect the place when danger might otherwise occur. In addition to the foregoing I have materially simplified construction and made convenient the operation of the apparatus, so that any unskilled person can run the same with ease and safety.

Now, referring to the parts severally, A represents the gasolene tank, which may be located any place within or without the residence or other building where the lighting takes place, but usually in an out building or in some cases even dropped into an opening in the earth where it can be conveniently approached from above and all danger to the house from possible explosion is avoided, although such dangers are minimized by modern appliances and knowledge of the character of gasolene, so that real danger on this account need not be specially reckoned with. Pressure is sustained in this vessel or tank in any available way and a supply pipe P leads therefrom to the apparatus where vaporization occurs in manner as shown. Thus, the said pipe P enters the apparatus at its bottom through the head H upon the bottom of vapor generator C, about which is arranged the main burner B, said burner serving to heat the generator and promote vaporization of the gasolene. Any suitable form of generator may be employed. In this instance, however, I show a generator comprising four tubes $c$ formed integral with the ends of said generator in which are shallow chambers open to all the burners, and upon the lower end of the generator the head H is affixed by means of a coupling nut M, a suitable gasket intervening to make the joint fluid tight. The meeting portions of the said chamber and head H have flanges 2 and 3 respectively, over which coupling nut M is lapped from above, and these flanges encompass a chamber in which is supported the diaphragm D hereinbefore referred to and which serves to automatically control main inlet valve V. Said valve is seated from below in head H, and is supported from below by a suitable sustaining spring S which has strength enough not only to maintain the valve upon its seat and perfectly close the valve, but also to carry the diaphragm D, which is supported upon the upper fluted stem 4 of said valve.

The diaphragm itself has a lug or projection d centrally at its top which has a bearing in a recess or cavity in the bottom of chamber C, and thus said diaphragm is kept in a horizontal position with its immediate rest upon said valve stem, and its own balancing projection d above maintaining it in right working position. Said diaphragm is constructed of expansive material sensitive to heat and is preferably hollow with separate substantially flat or dished sides forming a chamber between them preferably filled with alcohol and sealed. Then as the metal and alcohol become warm and expansion occurs it can only go downward, because at the top and center the diaphragm abuts the vaporizing chamber. This opens valve V correspondingly when it heats, and when opened the oil passes through this valved opening. Until this channel or passage way is open, which may require thirty minutes or more after the device is heated, I open valve W, which controls an inlet 5 through valve head H to the vapor generator, and this latter valve is to be closed when valve V is opened. This being done, the apparatus comes wholly under automatic control, both for the supply of oil thereto and for the cutting off of the supply when the lights go out or for any other reason fail to work.

At the top of the vapor generator, there is a lateral outlet 6 and passage to mixing chamber N, controlled by needle valves m, which control the flow of gas to the burners within the control of anyone having the apparatus in hand and valves m are in duplicate so as to regulate the flow of vapor according to the number of burners used. The said mixer or mixing chamber N has a suitable inlet for air and a controlling mixing tube 7 within said chamber having a supporting stem 8 at one side and a nut 9 outside of said chamber whereby said tube 7 can be raised or lowered with respect to the valve inlet thereto to control and determine the volume of air taken into the mixture. In fact the air can be entirely cut off by tube 7, if that were deemed desirable, and the proportion thereof with the gas can be determined with nicety by this means, and from this point the vapor and air mixed and constituting, the gas so-called, goes forward through distributing pipe G to the respective burners, not shown. A pipe connection indicated by E and having a needle valve control also conveys gas from said pipe G down to burner B through which a vaporizing heat is sustained round about the vapor generator C.

For initial starting of the apparatus and heating of the vaporizing chamber or generator another line of devices is provided. The gasolene tank A is never designed to be entirely full of gasolene and has more or less compressed air in its top mixed with such measure of gasolene vapor as constitutes a combustible mixture, and I draw off a portion of this mixture for initial heating through tube or hose F which goes to a valve controlled coupling K provided with an arm 12 having a duct which is controlled by needle valve 13 whence the vapor flows by tube 14 to the primary burner 15 at its end. This burner is located so as to heat initial heater I, arranged opposite generator C and before an opening in drum J for said generator, and which incloses burner B. A vapor duct 18 controlled by valve 19 supplies vapor from the top of the generator to the initial heater I, the said duct 18 having its extension beneath and to the rear of said heater as seen in Fig. 2, and the gas issues through head 20 into said heater where it is ignited. We have therefore the primary burner 15 trained on to heater I, and heater I trained onto the main generator to bring the same to a generating state. This done valve W below is opened and the apparatus begins to do its work.

Primary burner 15 is always ready for use and will suffice to start the apparatus with a minimum amount of mixture and air from within tank A. Constant pumping of air into the tank to keep up the pressure in starting the device is not necessary with my invention. The pump R is designed to pump air into the air or pressure supply tank A.

What I claim is:

1. In a gasolene heating and lighting apparatus, a tubular vapor generator provided with an inlet chamber at its bottom open alike to all the tubes thereof and an oil supply passage leading to said chamber, a spring pressed main valve adapted to open and close said passage to said chamber, having a projection at its top entering said chamber, an expansible valve controlling device seated centrally on said projection and having a point at its top and center resting against the wall of the generator, a by-pass to said chamber and a hand controlled valve therefor, and means to heat said generator and said expansible device.

2. A gasolene heating and lighting apparatus comprising a vapor generator consisting of a series of tubes, and initial heater at the top thereof, a primary burner to start said initial heater and a permanent heater for said generator about said tubes, in combination with a gasolene tank, a vapor conducting channel from the top of said tank to said primary burner and a gasolene conductor from the bottom of said tank to said generator, and vapor channels from said chamber to said initial heater and to said permanent burner, the channel to said permanent burner comprising a mixer and a valve controlled passage E outside said mixer to said permanent heater.

In testimony whereof I sign this specification in the presence of two witnesses.

THOMAS J. FORDE.

Witnesses:
  E. M. FISHER
  F. C. MUSSUN.